April 12, 1949.  R. A. SUTHANN  2,466,975
SPROCKET ADAPTER
Filed Aug. 6, 1945
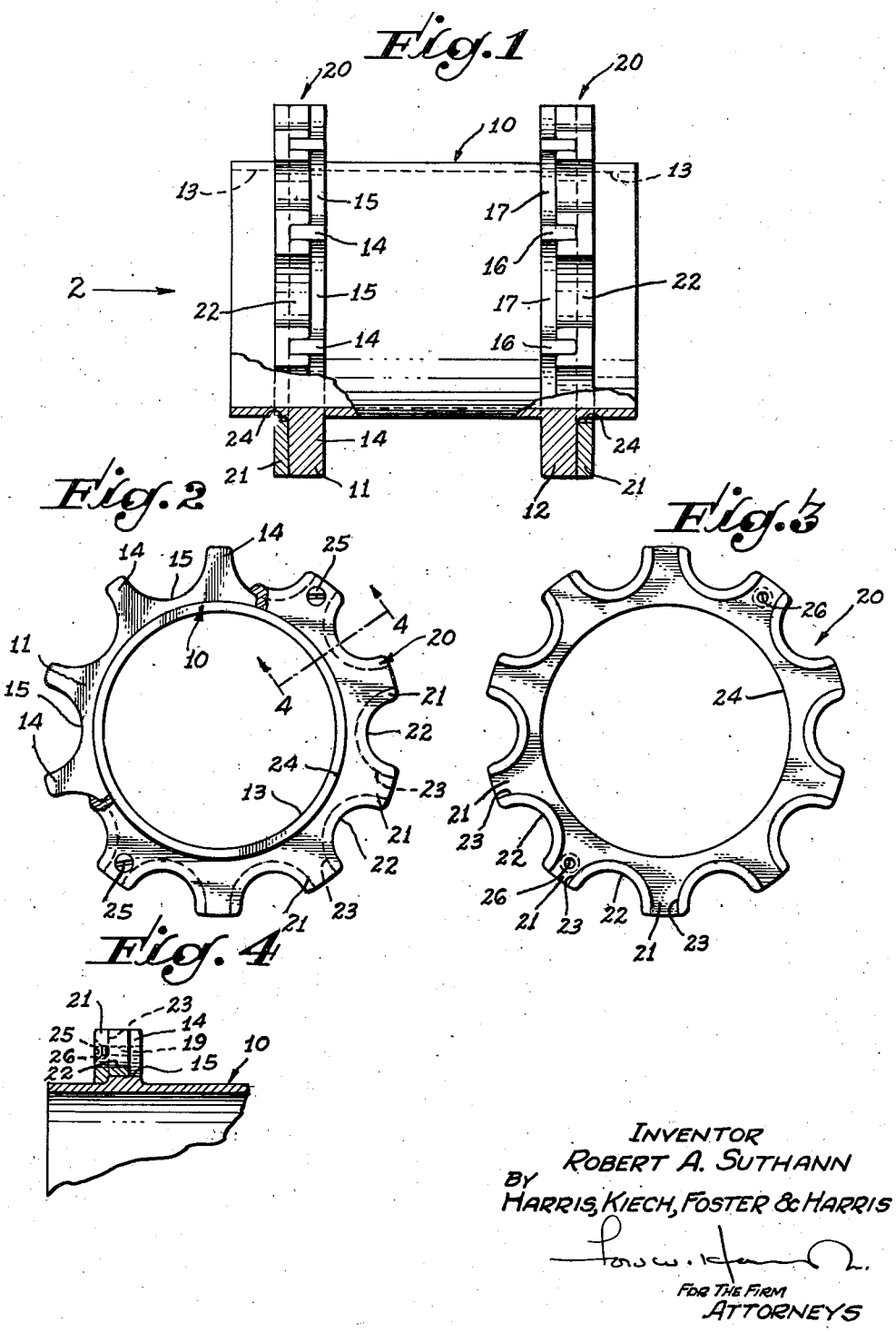
INVENTOR
ROBERT A. SUTHANN
BY
HARRIS, KIECH, FOSTER & HARRIS
FOR THE FIRM
ATTORNEYS Patented Apr. 12, 1949

2,466,975

UNITED STATES PATENT OFFICE 2,466,975

SPROCKET ADAPTER

Robert A. Suthann, Los Angeles, Calif., assignor to Hughes Tool Company, Houston, Tex., a corporation of Delaware Application August 6, 1945, Serial No. 609,233

3 Claims. (Cl. 198—211)

My invention relates to adapter means for modifying a gear or sprocket and a primary objective of my invention is the provision of a device of this general character which permits selective employment of a single basic sprocket with articles of various configurations and/or sizes by modifying the dimensions of the teeth of the sprocket to accommodate the desired article therebetween.

Those familiar with manufacturing processes will recognize the fact that whenever relatively minor variations of a unit are necessary to permit a more universal application thereof, it is frequently far more economical to provide means for adapting a basic unit to a variety of installations than to fabricate a separate and complete unit for each individual installation. The employment of adapter means permits large scale production of the single basic unit which may then be modified readily in minor respects to adapt it to a specific installation.

The nature of many installations incorporating sprocket-driven transmission or conveyor systems demands that the sprockets be readily removable or adapted for modification to permit a greater universality of application of the installations. A graphic illustration of these considerations is offered by armament installations wherein ammunition is conveyed from an ammunition container to the breech of a machine gun by means of a continuous belt of cartridges which is trained over and driven by suitable booster sprockets, the teeth of the latter being adapted to receive the individual cartridges therebetween. Ammunition boosters are usually provided with two sprockets of different size to conform to the difference in size between the ends of each cartridge. Similarly, gun installations of different calibers require ammunition boosters having sprockets of different sizes. Consequently, it is highly desirable to be able to employ a basic sprocket for all installations and modify the basic sprocket by means of a suitable adapter for a specific installation.

An important objective of my invention, therefore, is the provision of a basic sprocket having teeth which are adapted for engagement with a primary article, such as a cartridge of one caliber, and which may be modified readily to permit the employment of the sprocket with a variety of secondary articles, such as cartridges of other calibers.

Another important object is the provision of sprocket adapter means of various sizes and shapes for modifying the configuration and/or size of the teeth of the basic sprocket to permit employment thereof with alternative secondary articles.

A further object of my invention is to provide sprocket adapter means having pitch diameters and diametral pitches which may be substantially equal to the pitch diameter and diametral pitch of the basic sprocket.

An additional object is to provide sprocket adapter means which will not materially increase the outside diameter of the basic sprocket.

Still another objective of my invention is the provision of sprocket adapter means which may be installed on or removed from the basic sprocket with a minimum expenditure of time and effort.

A further objective of the invention is to provide a simple and inexpensive device of this nature which is light and compact.

I prefer to effect a realization of these and other objectives of my invention by providing a suitable sprocket adapter having teeth thereon which are adapted for engagement with and for effecting the desired modification of the shape or size of the teeth of the basic sprocket. The disclosure of a specific embodiment of my invention may best be introduced by referring to the accompanying drawing, which is for illustrative purposes only, wherein:

Fig. 1 represents a plan view which is partially in section and illustrates an assembled form of my invention having two sprockets, each of which has an adapter mounted thereon;

Fig. 2 is an end view taken as indicated by the arrow of Fig. 1;

Fig. 3 is an end view of one of the sprocket adapters; and

Fig. 4 is a fragmentary sectional view taken along the line 4—4 of Fig. 2.

Referring to the drawing, the sprocket assembly may include a sprocket housing 10 which is provided with sprockets 11 and 12 thereon, the sprockets 11 and 12 each being adapted for engagement with a sprocket adapter 20 as will be discussed in detail hereinafter. The sprocket housing 10 is preferably of cylindrical form and may be provided with a circular longitudinal bore 13 therethrough to permit mounting of the housing 10. The sprocket 11 is provided with a plurality of uniformly-spaced teeth 14 thereon which define cavities 15 therebetween, the dimensions of the cavities 15 being sufficient to permit the reception of the desired primary articles therein. The sprocket 12 is provided with teeth 16 thereon defining cavities 17 therebetween, the teeth 16 and cavities 17 preferably being identical to the teeth 14 and cavities 15 of the sprocket 11. The cavities 15 and 17 in the sprockets 11 and 12 are adapted to receive the large ends of cartridges, or other primary articles, therein and the smaller cavities required by the small ends of the cartridges are provided by employing one of the adapters 20 about to be described.

Each sprocket adapter 20 is provided with a plurality of uniformly-spaced teeth 21 thereon corresponding in number to the teeth 14 and 16 of the sprockets 11 and 12, respectively. The teeth 21 define cavities 22 therebetween which are adapted to receive secondary articles of a desired size and shape therein, the teeth 21 being provided with recesses 23 therein which are complementary to and adapted to receive the corresponding teeth 14 or 16 of the sprockets 11 or 12. The sprocket adapter 20 is also provided with an opening 24 therethrough which is adapted to permit insertion of the sprocket housing 10 therein. Upon assembly, the sprocket housing 10 is inserted in the opening 24 and the teeth 14 or 16 of the sprockets 11 or 12 are disposed within the recesses 23 in the teeth 21 of the adapter 20, the latter being securable to the sprocket 11 or 12, as best shown in Fig. 4, by means of screws 25 inserted through holes 26 in the teeth 21 and adapted for threaded engagement with registering holes 19 in the teeth 14 or 16.

When the basic sprockets 11 and 12 and the adapters 20 are thus assembled, the teeth 21 of the latter modify the dimensions of the basic teeth 14 and 16 to provide cavities 22 therebetween of a suitable shape and size, the pitch diameters of the basic sprockets 11 and 12 and modified sprockets 20 being substantially equal. The provision for equal pitch diameters makes relocation of the axis of rotation of the sprocket housing 10 unnecessary whenever the adapters 20 are installed and this is an important feature of the invention. The basic sprockets 11 and 12 may also be applied to articles of substantially different size without materially increasing the over-all diameter thereof.

If the basic sprockets 11 and 12 are designed to accommodate primary articles of specified dimensions between the teeth 14 and 16 thereof, the basic sprockets 11 and 12 may be employed with a multitude of secondary articles of smaller dimensions by providing a plurality of alternate adapters 20 suitable for use therewith, each adapter 20 providing progressively smaller cavities 22 between the teeth 21 thereof. The adapters 20 may also be adapted to modify the configuration of the teeth 14 and 16 of the sprockets 11 and 12 as well as the size thereof by incorporating teeth 21 of appropriate shapes and sizes consistent with the dimensions of the secondary articles to be inserted therebetween.

It will be understood that by employing suitable combinations of adapters 20 for the two basic sprockets 11 and 12, two points of contact may be provided for secondary articles of various dimensions and of varying degrees of taper or cross-sectional uniformity. The sprockets 11 and 12 may be used without the adapters 20, or either or both of the sprockets 11 and 12 may be employed with adapters 20. It will also be understood that the sprockets housing 10 may be provided with any desired number of sprockets 11 or 12 and that the sprockets 11 and 12 need not be of the same size.

My invention thus provides a means for adapting a single basic sprocket to a wide variety of installations, and, since it is obviously more economical to provide a plurality of adapters for use with a single basic sprocket than to provide a large number of complete sprockets, a considerable reduction in material, manufacturing, and assembly expenses will result. The adapters 20 provide a convenient means for modifying the dimensions of the teeth of the basic sprocket which is adapted for rapid and facile installation and which may be manufactured readily and inexpensively. Since the adapter 20 is adequately supported by the sprocket teeth, the forces communicated thereto are transmitted to the teeth and the adapter 20 may be of relatively light construction. The weight of a full complement of adapters 20 for a single basic sprocket is thus materially less than the weight of a complete set of individual sprockets.

Although I have herein described a specific embodiment of my invention and have suggested various applications thereof, I do not intend to be limited to the specific disclosures contained herein since those proficient in the art will immediately recognize various changes, substitutions and modifications of my underlying inventive concept. I hereby reserve the right, therefore, to all such changes, modifications and substitutions that properly come within the scope of my appended claims.

I claim as my invention:

1. In a conveyor member for an ammunition booster the combination of: a cylindrical hub; a pair of sprocket portions formed on said hub spaced inwardly from the ends thereof, each of said sprocket portions having an identical number of tooth spaces formed therein and being relatively positioned to place said spaces in longitudinal alignment; a ring-shaped adapter member having an internal diameter such as to fit over said hub and an external diameter substantially equal to the external diameter of said sprocket portions, said adapter being formed with a number of teeth equal to the number of teeth in said sprocket portions, each of said teeth in said adapter having a recess adapted to receive a tooth in said sprocket portion whereby said adapter member is adapted to fit over said sprocket portion and be driven thereby; and means to secure said adapter member selectively to either of said sprocket members.

2. In a conveyor member for an ammunition booster the combination of: a hub; a pair of sprocket portions formed on said hub each having an identical number of substantially identically shaped tooth spaces formed therein, said sprocket portions being relatively positioned to place said spaces in longitudinal alignment; and a unitary adapter removably secured to one of said sprocket portions having an internal shape complemental to said sprocket portions whereby to be secured selectively to either one of said sprocket portions, said adapter having a number of peripheral spaces equal to said number of tooth spaces but differing in shape therefrom.

3. In a conveyor member for an ammunition booster the combination of: a hub; a pair of longitudinally spaced identical sprocket portions formed on said hub and positioned in alignment with each other; and a unitary adapter removably secured to one of said sprocket portions having an internal shape complemental to said sprocket portions whereby to be secured selectively to either one of said sprocket portions, said adapter having peripheral tooth spaces equal in number to tooth spaces in said sprocket portions but differing in shape therefrom.

ROBERT A. SUTHANN.

REFERENCES CITED

The following references are of record in the file of this patent:

UNITED STATES PATENTS

| Number | Name | Date |
|---|---|---|
| 358,771 | Dodge | Mar. 1, 1887 |
| 1,143,819 | Failing | June 22, 1915 |
| 1,574,307 | Risser | Feb. 23, 1926 |
| 2,155,518 | Wehner | Apr. 25, 1939 |
| 2,403,170 | Chapman et al. | July 2, 1946 |